US011364851B2

(12) United States Patent
Larsson et al.

(10) Patent No.: US 11,364,851 B2
(45) Date of Patent: Jun. 21, 2022

(54) LOAD CARRIER

(71) Applicant: Thule Sweden AB, Hillerstorp (SE)

(72) Inventors: Fredrik Larsson, Vaggeryd Jönköping (SE); Stefan Andersson, Värnamo Jönköping (SE); Jens Christensen, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 5 days.

(21) Appl. No.: 17/044,925

(22) PCT Filed: Mar. 26, 2019

(86) PCT No.: PCT/EP2019/057620
§ 371 (c)(1),
(2) Date: Oct. 2, 2020

(87) PCT Pub. No.: WO2019/197156
PCT Pub. Date: Oct. 17, 2019

(65) Prior Publication Data
US 2021/0155165 A1 May 27, 2021

(30) Foreign Application Priority Data
Apr. 11, 2018 (EP) .................................... 18166744

(51) Int. Cl.
*B60R 9/058* (2006.01)
*B60R 9/045* (2006.01)
(Continued)

(52) U.S. Cl.
CPC .............. *B60R 9/058* (2013.01); *B60R 9/045* (2013.01); *B60R 9/052* (2013.01); *B60R 2011/004* (2013.01)

(58) Field of Classification Search
CPC ................................ B60R 9/052; B60R 9/058
See application file for complete search history.

(56) References Cited

U.S. PATENT DOCUMENTS 5,002,216 A  3/1991 Gerber
5,553,761 A  9/1996 Audoire et al.
(Continued)

FOREIGN PATENT DOCUMENTS

CN  103857561 A  6/2014
CN  105292001 A  2/2016
(Continued)

OTHER PUBLICATIONS

International Search Report and Written Opinion of the International Searching Authority for International Application No. PCT/EP2019/057620, European Patent Office (EPO), Berlin, dated May 6, 2019, 12 pages.

(Continued)

*Primary Examiner* — Scott T McNurlen
(74) *Attorney, Agent, or Firm* — Sterne, Kessler, Goldstein & Fox P.L.L.C.

(57) ABSTRACT

The roof rack foot for a roof rack for a vehicle as disclosed herein comprises a body and a cross bar coupling member. The body comprises a support surface. The cross bar coupling member has a length extending in a longitudinal direction, and a height extending in a height direction. The cross bar coupling member comprises a length adjustment member. The length adjustment member extends in the longitudinal direction and has an elongated body portion and an axially aligned first end portion. The cross bar coupling member is configured to engage with the first end portion of the length adjustment member and to enable the length adjustment member to be fully or partly inserted into a cross bar end cavity when the cross bar coupling member is received in a roof rack cross bar in a retained position.

20 Claims, 9 Drawing Sheets

(51) Int. Cl.
*B60R 9/052* (2006.01)
*B60R 11/00* (2006.01)

(56) References Cited

U.S. PATENT DOCUMENTS

| | | | | |
|---|---|---|---|---|
| 5,931,359 | A | * | 8/1999 | Zona .................. B60R 9/052 |
| | | | | 224/321 |
| 6,182,876 | B1 | * | 2/2001 | Moliner .............. B60R 9/058 |
| | | | | 224/321 |
| 6,382,483 | B1 | | 5/2002 | Kleb et al. |
| 9,421,918 | B2 | * | 8/2016 | Lundgren .......... B60R 9/058 |
| 2014/0224850 | A1 | | 8/2014 | Lundgren |
| 2015/0151686 | A1 | | 6/2015 | Chang |

FOREIGN PATENT DOCUMENTS

| | | | |
|---|---|---|---|
| EP | 0338633 A1 * | 10/1989 | .......... B60R 9/12 |
| EP | 3106351 A1 | 12/2016 | |
| FR | 2707938 A1 | 1/1995 | |
| FR | 2723046 A1 | 2/1996 | |
| FR | 2879536 A1 | 6/2006 | |
| RU | 2409486 C1 | 1/2011 | |
| WO | 91/01233 A1 | 2/1991 | |
| WO | 2013/037558 A1 | 3/2013 | |

OTHER PUBLICATIONS

Office Action and Search Report for Chinese Application No. 201980024508.6, Chinese Patent Office, dated Mar. 23, 2021, 9 pages.

* cited by examiner

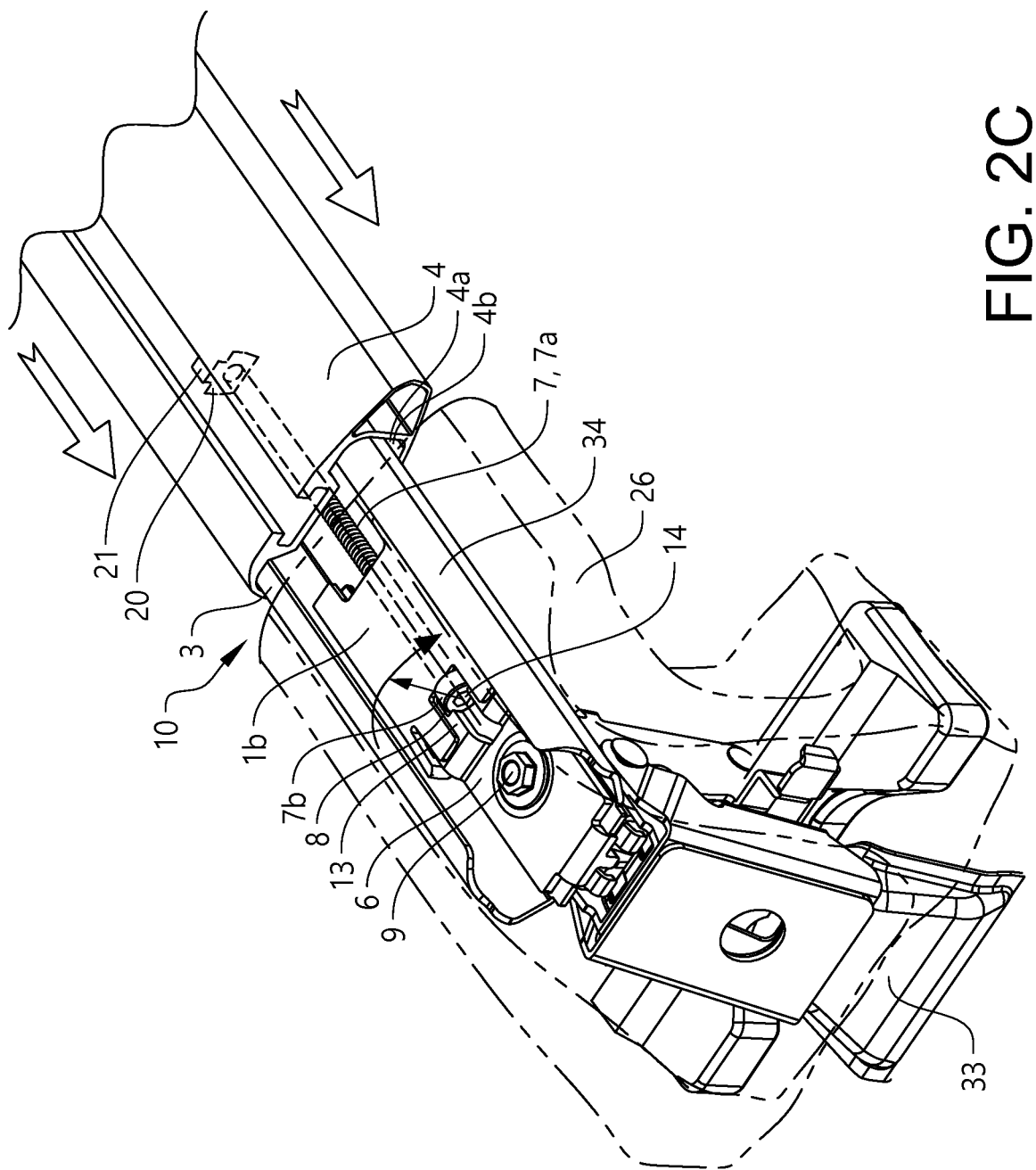

LOAD CARRIER

TECHNICAL FIELD

The disclosure pertains to a roof rack foot for a roof rack for a vehicle. More specifically, the present disclosure pertains to a roof rack foot comprising a body and a cross bar coupling member being adapted to be received by and connected to an end of a roof rack cross bar, the cross bar coupling member further being provided with a length adjustment member. Moreover, the present disclosure pertains to a roof rack cross bar adapted to be received by and connected to the roof rack foot and a system comprising the roof rack foot and the roof rack cross bar.

BACKGROUND OF THE INVENTION

A roof rack generally has a first and a second roof rack foot and a roof rack cross bar extending there between. It is important that the roof rack feet are mounted and attached correctly to the vehicle roof. Different types of roof rack feet have been developed. One type of roof rack foot is a fix-point roof rack foot. A fix-point roof rack foot uses fixed positions on the vehicle roof to attach the roof rack foot. Usually a nut welded to the vehicle roof, or welded to the vehicle roof chassis, serves as a fixed anchoring point for a fix-point roof rack foot. A draw back with a fix-point roof rack foot is, of course, the limited amount of available positions at which the roof rack foot can be positioned.

Another type of roof rack foot is a roof rack foot of the clamping type. Such a roof rack foot uses a clamping force between a support surface and a bracket as the main attachment principle. An advantage with this type of roof rack foot is that the roof rack foot can be positioned in a plurality of different positions, generally along a rail arranged on the roof of the vehicle. A roof rack foot of the clamping type is disclosed in the published patent application No. FR 2,879, 536 A1. The roof rack foot in FR 2,879,536 A1 has a support body and a bracket pivotally connected to the support body.

There is a risk that a roof rack foot of the clamping type is incorrectly mounted. Important factors for reducing the risk of a user mounting a roof rack foot of the clamping type incorrectly are the ease with which the roof rack foot can be mounted and the amount and degree of complexity of any instructions needed for correct mounting. Ideally, the construction of the roof rack foot should be such as to be self-explanatory with regard to how the roof rack foot is to be mounted.

Vehicle roof racks are generally designed with safety and easy handling in focus. Further important aspects to take into consideration are wind resistance and air turbulence as roof rack cross bars tend to be space consuming and to cause wind turbulence when a vehicle is moving.

As a vehicle moves and as the wind passes the roof rack cross bar, a turbulent flow of air is produced around the cross bar; this is especially the case when a roof rack carries no load. The turbulent flow of air produces noise and increases the overall wind resistance of the vehicle, and thereby the fuel consumption.

Furthermore, roof rack feet and roof rack cross bars are often assembled together by the manufacturer. As vehicles have different roof widths, in order to supply all possible combinations of roof rack feet and cross bars, a large number of separate sets of feet and cross bars of different lengths must be provided. This is inefficient as distributors, warehouses and stores must keep stock with complete sets of feet with different lengths of cross bars. Complete packages with cross bars and feet take up a considerable amount of storage space.

Accordingly, it is an object of the present disclosure to offer a roof rack foot for a roof rack with low wind resistance. A further object may be to offer a roof rack foot having an improved connection to a cross bar roof rack.

SUMMARY OF THE INVENTION

One or more of the above objects may be achieved with a roof rack foot for a roof rack for a vehicle according to claim 1 and/or claim 15, a roof rack cross bar adapted to be received by and to be connected with a roof rack foot, in accordance with claim 13, and a system comprising a roof rack foot and a roof rack cross bar according to claim 14. Further embodiments are set out in the dependent claims, in the following description and in the drawings.

As such and according to a first aspect, the present disclosure relates to a roof rack foot for a roof rack for a vehicle. The roof rack foot comprises a body and a cross bar coupling member. The cross bar coupling member is adapted to be inserted into an end opening and to be at least partly received in and connected to an end cavity of a roof rack cross bar in a retained position. The body comprises a support surface adapted to be positioned against a first surface of the vehicle. The cross bar coupling member has a length extending in a longitudinal direction and a height extending in a height direction. The cross bar coupling member comprises a length adjustment member. The length adjustment member extends in the longitudinal direction and has an elongated body portion and an axially aligned first end portion. The cross bar coupling member is configured to engage with the first end portion of the length adjustment member and to enable the length adjustment member to be fully or partly inserted into the cross bar end cavity when the cross bar coupling member is received in the roof rack cross bar in a retained position.

The roof rack cross bar and the roof rack coupling member each has a length and a height. Both the height of the vehicle to which the roof rack is to be mounted and the height of the roof rack cross bar and the roof rack coupling member are measured in a height direction along a Z axis which extends in the vertical direction of the vehicle when the vehicle is standing on a planar, horizontal surface. The width of the vehicle and the length of the roof rack cross bar and the roof rack coupling member are each measured along an X axis which is perpendicular to the Z axis. A length of the vehicle is measured along a Y axis which is perpendicular to the Z and X axes. The longitudinal direction of the roof rack coupling member and the roof rack cross bar corresponds to the width direction of the vehicle.

The length adjustment member comprises the first end portion and a second end portion being located axially opposite to the first end portion, the first end portion being in engagement with the cross bar coupling member and the second end with the cross bar when the when the cross bar coupling member is received in the roof rack cross bar in a retained position. The length adjustment member extends in the longitudinal direction of the cross bar coupling member and the first end portion may also be referred to as a proximal end portion and the second end portion as a distal end portion, in relation to the body of the roof rack foot.

The fact that the cross bar coupling member is configured to enable the length adjustment member, including the elongated body portion and the axially aligned first end portion, to be fully inserted into the cross bar end cavity when the cross bar coupling member is received in the roof rack cross bar in a retained position provides for a roof rack foot having a cross bar coupling member with a low height, consuming little space within the roof rack cross bar. Particularly, when the first end portion of the length adjustment member, such as a bolt or a screw head, fits inside the end cavity of the roof rack cross bar this enables a longer distance of telescoping the roof rack cross bar. Thereby, fewer different lengths of cross bars need to be stocked since with fewer length the same number of vehicle roofs or even a greater number can be fitted with the cross bars The first end portion of the length adjustment member may thus be arranged flush with, or below, the part of the cross bar coupling member which engages with the first end portion of the length adjustment member, as seen in a height direction when the roof rack foot is mounted on a vehicle. This enables the provision of a combination of a length adjustable cross bar coupling member and a low height roof rack cross bars which reduces the wind resistance and creates less air turbulence when the vehicle is moving. This additionally provides for a larger surface, in a longitudinal direction, which may be a load carrying surface of the mounted roof rack.

The cross bar coupling member is adapted to be inserted into an end opening and to be at least partly received in and connected to an end cavity of a roof rack cross bar in a retained position, wherein the end opening is a cross-sectional end opening and the end cavity of the cross bar is an end cavity extending in the longitudinal direction of the cross bar. Hence, the cross bar coupling member is adapted to be inserted and received in the roof rack cross bar in the longitudinal direction.

The length adjustment member is operable to displace the cross bar coupling member in the longitudinal direction to enable adjustment of the roof rack to vehicles with different roof width. Hence, the cross bar coupling member also provides for improved and versatile coupling capabilities between the roof rack foot and the roof rack cross bar, enabling length adjustment of the cross bar coupling member by means of the length adjustment member.

The engaging part of the cross bar coupling member which is configured to engage with the first end portion of the length adjustment member, may, for example, be in the form of an opening, extending in the longitudinal direction of the cross bar coupling member, through which opening the length adjustment member may be inserted. Alternatively, the engaging part of the cross bar coupling member may be in the form of a notch, in which the first end portion of the length adjustment member may be inserted and/or supported.

The roof rack foot as disclosed herein may easily be assembled by an end user. Therefore, the roof rack foot and the roof rack cross bar may be sold non-assembled, which reduces the number of combinations needed for the distributors, warehouses and stores to stock and supply. Since the cross bar coupling member is a length adjustable cross bar coupling member even fewer variations of roof rack cross bars need to be kept in stock.

The roof rack cross bar may be formed with an internal channel, extending between a first and a second end of the roof rack cross bar. The cross bar coupling member is adapted to be at least partly received in the end cavities formed by the channel in the roof rack cross bar first and second ends.

The end cavity of the cross bar may have a maximum internal cross section height and the first end portion of the length adjustment member may have a maximum diameter and wherein the height may be from 1 to 15% greater than the maximum diameter of the first end portion of the length adjustment member. Preferably, the height may be from 1 to 10% greater than the maximum diameter of the first end portion of the length adjustment member. More preferably, the height may be from 1 to 5% greater than the maximum diameter of the first end portion of the length adjustment member.

The roof rack foot may also comprise a roof rack foot housing, configured for housing the first or second end of the roof rack cross bar, which may cooperate with the cross bar coupling member to retain the roof rack cross bar in a retained position.

The length adjustment member may be a rotatable length adjustment member, such as a screw or a bolt, having a threaded elongated body portion. The first end portion may be provided with a drive recess and the cross bar coupling member may be configured for allowing the drive recess of the first end portion to be accessible and the length adjustment member to be rotatably driven. The length adjustment member may for example be rotatably driven by means of a screwdriver, wrench or adjustment key.

The first end portion of the length adjustment member may be a head portion, having a larger diameter than the elongated body portion of the length adjustment member. According to the present disclosure, the configuration of the cross bar coupling member should be such that the head portion of the length adjustment member may be, fully or partly, inserted into the cross bar end cavity when the cross bar coupling member is received in the roof rack cross bar in a retained position. If the head portion of the length adjustment member cannot be inserted into the cross bar end cavity, the length adjustment possibilities are greatly reduced.

The cross bar coupling member may be fixedly attached to the body of the roof rack foot with an attachment member, such as a screw or a bolt, having an attachment member head portion projecting out from the cross bar coupling member in the height direction.

The cross bar coupling member may be configured for holding the first end portion of the rotatable length adjustment member in an elevated plane, in the height direction of the cross bar coupling member, in relation to the attachment member head portion such that the drive recess of the first end portion is accessible, allowing the length adjustment member to be rotatably driven by a tool, such as by means of a screwdriver, wrench or adjustment key.

The fact that the cross bar coupling member is configured for holding the first end portion of the rotatable length adjustment member in an elevated plane, in the height direction of the cross bar coupling member, in relation to the attachment member head portion such that the drive recess of the first end portion is accessible, provides for an easy assembly of the roof rack foot and the roof rack cross bar in combination with an improved loading space for the roof rack.

The cross bar coupling member may comprise an intermediate support member. The intermediate support member may be an integrated part or a separate part of the cross bar coupling member. The intermediate support member may be configured to engage with the first end portion of the length adjustment member. The intermediate support member is configured to enable the first end portion of the length adjustment member to be inserted into the cross bar end cavity when the cross bar coupling member is received in the roof rack cross bar in a retained position.

The intermediate support member may extend in the longitudinal direction of the cross bar coupling member, and may have a stepped configuration, in the height direction of the cross bar coupling member, with a first and a second substantially parallel plane. The second plane of the cross bar coupling member is an elevated plane compared to the first plane, as seen when the roof rack foot is mounted on a vehicle and the intermediate support member holds the length adjustment member in the second plane.

The fact that the intermediate support member has a stepped configuration, with the second plane being a more elevated plane and the length adjustment member being held by the intermediate support member in the second plane, facilitates access to the first end portion, such as a head portion of a screw or bolt. Thereby, adjustment of the roof rack length is facilitated, which may otherwise be troublesome, for example due to other protruding part such as a screw or bolt provided to secure the cross bar coupling member or the intermediate support member to the body of the roof rack foot.

The intermediate support member may comprise at least a first and a second coupling leg extending in the longitudinal direction, wherein the first and the second coupling leg each comprises an engaging part for engaging with the first end portion of the length adjustment member. The length adjustment member may be arranged to extend in a gap provided between the first and the second coupling leg. The first and the second coupling leg may furthermore extend in the second plane, in the height direction of the cross bar coupling member. The first and second coupling legs are arranged to steer and support the length adjustment member during insertion in and coupling to the end cavity of the roof rack cross bar. The first and the second coupling leg provided on each side of the length adjustment member may also stabilize the length adjustment member upon when the coupling legs are inserted in the end cavity of the cross bar. The intermediate coupling member may have a width which is slightly greater than the cross sectional width of the cross bar end cavity. The coupling legs are preferably resilient or slightly resilient whereby they can be laterally compressed such that the coupling legs are bent slightly towards each other upon insertion of the coupling legs within the end cavity of the cross bar, causing the gap formed between the first and the second coupling legs to be reduced. The lateral compression of the coupling legs gives rise to a spring-back force in the coupling legs, which may contribute to keep the coupling legs firmly within the end cavity of the cross bar by exerting a pressing force against adjacent components in the arrangement.

Optionally, a sleeve, such as a resilient sleeve, may be mounted under lateral tension over the first and the second coupling leg, the sleeve being arranged to exert friction against the elongated body portion of the length adjustment member upon rotational movement of the length adjustment member. Preferably the sleeve comprises a guiding track on an inner surface of the sleeve wherein the elongated body portion of the length adjustment member is arranged in the guiding track. The sleeve may for example be made of a polymeric resilient material such as for example polyoxymethylene (POM).

The fact that a sleeve is mounted under lateral tension over the first and the second coupling leg laterally compresses the coupling legs by bending them towards each other such that the gap formed there between is reduced and the positioning of length adjustment member is stabilized.

The fact that the sleeve is being arranged to exert friction against the elongated body portion of the length adjustment member upon rotational movement of the length adjustment member provides for a rotational resistance against unscrewing of the length adjustment member.

The fact that the sleeve comprises a guiding track on an inner surface thereof, and wherein the elongated body portion of the length adjustment member is arranged in the guiding track, steers the length adjustment member during length adjustment and improves the rotational resistance against unscrewing of the length adjustment member.

The cross bar coupling member may comprise a locking member adapted to form an engagement and an interlocked position with the cross bar when the cross bar coupling member is at least partly received in the end cavity of the cross bar. The locking member may, for example, form an engagement and an interlocked position between the cross bar coupling member and the roof rack cross bar prior to length adjustment of the cross bar coupling member.

The fact that the cross bar coupling comprises a locking member for connecting the roof rack foot with the roof rack cross bar, such as, prior to adjusting the length of the roof rack with the length adjustment member, facilitates the assembly of the roof rack foot with the roof rack cross bar for the end user. The roof rack foot and the roof rack cross bar may be connected prior to mounting of the roof rack on the vehicle roof. Subsequent length adjustment of the roof rack to size adapt the roof rack to the user's vehicle may be made after the roof rack has been lifted onto the roof of the vehicle.

The length adjustment member may be connected to the locking member and be operable to displace the locking member and the cross bar in the longitudinal direction of the cross bar coupling member when the cross bar coupling member is in the interlocked position with the cross bar, allowing length adjustment of the roof rack to fit the roof width of the vehicle.

However, the locking element may alternatively be connected directly to the cross bar coupling member or indirectly to the cross bar coupling member via a separate connecting member.

The length adjustment member may be a rotatable length adjustment member, such as a screw or a bolt. The locking member may be threadably engaged with the length adjustment member, such as by means of a threaded aperture, enabling displacement of the locking member and the cross bar in the longitudinal direction when the cross bar coupling member is in the interlocked position with the cross bar.

The locking element may be configured for movement in the height direction during connection with the cross bar. The movement may for example be a resilient movement and the locking element may be adapted to form a resilient compression engagement with the mating cross bar, such as for example a snap lock engagement. To minimize the height needed for the cross bar coupling member to allow a downward movement of the locking element, the bottom part of the cross bar coupling member may be provided with a recess or opening to house the lower part of the locking member during insertion within the roof rack cross bar end cavity and until engagement is formed with the roof rack cross bar. The recess or opening may be arranged to allow a downward movement when the locking element is in an initial distal position, i.e. prior to length adjustment of the coupling member and rotational movement of the length adjustment member and movement of the locking element and roof rack cross bar in the longitudinal direction of the cross bar coupling member. However, as the locking element, together with the cross bar, is forced towards the body of the roof rack foot the locking element is displaced in relation to the recess or opening provided in the cross bar coupling member and is therefore kept in engagement with the cross bar. To allow downwards movement of the locking element and unlocking of the roof rack foot and the roof rack cross bar, the length adjustment member needs to be released until the locking member is in its initial position above the recess or opening again.

The locking member may comprise a male locking element adapted to form an engagement with a mating female cross bar locking element arranged on or in the cross bar. The engagement may for example be a snap lock engagement. Such engagement may for example include a movement in the height direction of the locking member during insertion and connection with the roof rack cross bar followed by an engagement of the male locking element in the female cross bar locking element.

The female cross bar locking element may be an opening or recess, preferably provided in an inner wall of the roof rack cross bar.

The male locking element may be a vertical shaft nut, wherein an end of the shaft nut is adapted to engage with the mating female cross bar locking element in the form of a recess or an opening.

In a second aspect, the present disclosure pertains to a roof rack cross bar adapted to be received and to be connected with a roof rack foot according to the first aspect. Optionally, the roof rack cross bar may comprise a female cross bar locking element, such as in the form of a recess or an opening, arranged on or in the roof rack cross bar.

In a third aspect, the present disclosure pertains to a system comprising a roof rack foot according to the first aspect and a cross bar according to the second aspect. Optionally, wherein the end cavity of the cross bar has a maximum internal cross section height and the first end portion of the length adjustment member has a maximum diameter and wherein the height is from 1 to 15% greater than the maximum diameter of the first end portion of the length adjustment member, optionally, the height is from 1 to 10% greater than the maximum diameter of the first end portion of the length adjustment member and optionally, the height is from 1 to 5% greater than the maximum diameter of the first end portion of the length adjustment member.

In a fourth aspect, the present disclosure pertains to a roof rack foot for a roof rack for a vehicle. The roof rack foot comprises a body and a cross bar coupling member, the cross bar coupling member having a length extending in a longitudinal direction and a height extending in a height direction. The cross bar coupling member is adapted to be inserted into an end opening and to be at least partly received in and connected to an end cavity of a roof rack cross bar in a retained position. The body of the roof rack foot comprises a support surface, i.e. a vehicle support surface, adapted to be positioned against a first surface of the vehicle. The cross bar coupling member comprises a locking member adapted to form an engagement with the cross bar in an interlocked position.

The cross bar coupling member is thus adapted to be inserted into an end opening and to be at least partly received in and connected to an end cavity of a roof rack cross bar in a retained position, wherein the end opening is a cross-sectional end opening and the end cavity of the cross bar is an end cavity extending in the longitudinal direction of the cross bar. Hence, the cross bar coupling member is adapted to be inserted and received in the roof rack cross bar in the longitudinal direction.

Optionally the locking member may comprise a male locking element adapted to form an engagement with a mating female cross bar locking element arranged on or in the cross bar.

The male locking element may be a vertical shaft nut, wherein an end of the shaft nut is adapted to engage with the mating female cross bar locking element in the form of a recess or an opening.

The female cross bar locking element may be an opening or recess, preferably provided in an inner wall of the roof rack cross bar.

Such configuration allows an easy locking function, such as a snap-lock, for facilitated assembly of a roof rack foot and roof rack cross bar, for example prior to length adjustment of the roof rack for the vehicle roof width. This provides an easy assembly which may be made at the user end and not requiring assembly already at manufacturing.

Optionally, the locking member comprises a male locking element adapted to form an engagement with a mating female cross bar locking element arranged on or in the cross bar.

Optionally the roof rack foot further comprises the features according to the first aspect.

The cross bar coupling member may comprise a locking member adapted to form an engagement and an interlocked position with the cross bar when the cross bar coupling member is at least partly received in the end of the cross bar.

The cross bar coupling member may comprise a length adjustment member. The length adjustment member extends in the longitudinal direction LD and has an elongated body portion and an axially aligned first end portion. The cross bar coupling member is configured to engage with the first end portion of the length adjustment member and to enable the length adjustment member to be inserted into the cross bar end cavity when the cross bar coupling member is received in the roof rack cross bar in a retained position.

The fact that the cross bar coupling member is configured to enable the length adjustment member to be inserted into the cross bar end cavity when the cross bar coupling member is received in the roof rack cross bar in a retained position provides for a roof rack foot having a cross bar coupling member with a low height, consuming little space within the roof rack cross bar. The first end portion of the length adjustment member may thus be flush with, or below, the part of the cross bar coupling member engaging with the first end portion of the length adjustment member, as seen in a height direction when the roof rack foot is mounted on a vehicle. This enables the combination of a length adjustable cross bar coupling member with a low height roof rack cross bar which reduces the wind resistance and creates less air turbulence when the vehicle is moving.

The length adjustment member is operable to displace the cross bar coupling member in the longitudinal direction to enable adjustment of the roof rack to vehicles with different roof width. Hence, the cross bar coupling member also provides for improved coupling capabilities between the roof rack foot and the roof rack cross bar enabling length adjustment of the cross bar coupling member by means of the length adjustment member.

As the roof rack foot according to the present invention may be easily assembled by the end user and as the cross bar coupling member is a length adjustable cross bar coupling member this allows for fewer packages needed for the distributors, warehouses and stores to handle. The number of different articles which need to be stocked and supplied can be considerably reduced both as the items may be sold non-assembled and as fewer sizes need to be kept in store to enable selection of an appropriate length for the roof rack cross bar.

The length adjustment member may be connected to the locking member and may be operable to displace the locking member and the cross bar in the longitudinal direction when the cross bar coupling member is in the interlocked position with the cross bar, allowing length adjustment of the roof rack to fit the roof width of the particular vehicle to which the roof rack is being mounted.

The length adjustment member may be a rotatable length adjustment member, such as a screw or a bolt. The locking member may also be threadably engaged with the length adjustment member, such as by means of a threaded aperture, enabling displacement of the locking member and the cross bar in the longitudinal direction when the cross bar coupling member is in the interlocked position with the cross bar.

The locking element may be configured for movement in the height direction during connection with the cross bar. The movement may, for example, be a resilient movement and the locking element may be adapted to form a resilient compression engagement with the mating cross bar, such as for example a snap lock engagement. For minimizing the height needed for said cross bar coupling member in order to allow a downward movement of the locking element, the bottom part of the cross bar coupling member may be provided with a recess or opening to house the lower part of the locking member during insertion within the roof rack cross bar end cavity and until engagement is formed with the roof rack cross bar.

The locking member may comprises a male locking element adapted to form an engagement with a mating female cross bar locking element arranged on or in the cross bar. The engagement may for example be a snap lock engagement. Such engagement may, for example, include a movement in the height direction of the locking member during insertion and connection with the cross bar followed by an engagement of the male locking element in the female cross bar locking element. The locking member may be arranged such that the male and female locking elements automatically snap into a locking engagement once the cross bar coupling member has been moved to its final position inside the roof rack cross bar end cavity.

The roof rack cross bar may be formed with an internal channel, extending between a first and a second end of the roof rack cross bar. The cross bar coupling member is thereby adapted to be at least partly received in the end cavities formed by the channel in the roof rack cross bar first and second end.

The body of the roof rack foot may also comprise a roof rack foot housing which may cooperate with the roof rack coupling member to retain the roof rack cross bar in a retained position. The roof rack foot housing is configured to receive and house the first or the second end of the roof rack cross bar, such that for example the cross-section of the roof rack foot housing correspond in contour to and is slightly larger than the cross-section of the roof rack cross bar.

The length adjustment member may be a rotatable length adjustment member, such as a screw or a bolt, having a threaded elongated body portion. The first end portion may be provided with a drive recess and the cross bar coupling member may be configured for allowing the drive recess of the first end portion to be accessible and the length adjustment member to be rotatably driven. The length adjustment member may for example be rotatably driven by means of a screwdriver, wrench or adjustment key.

The first end portion of the length adjustment member may be a head portion, having a larger diameter than the elongated body portion. For such configuration the importance of a configuration of the cross bar coupling member enabling the length adjustment member to be inserted into the cross bar end cavity when the cross bar coupling member is received in the roof rack cross bar in a retained position is even greater.

The cross bar coupling member may be fixedly attached to the body of the roof rack foot with an attachment member, such as a screw or a bolt, having an attachment member head portion projecting out from the cross bar coupling member in the height direction.

The cross bar coupling member may be configured for holding the first end portion of the rotatable length adjustment member in an elevated plane in the height direction in relation to the attachment member head portion such that the drive recess of the first end portion is accessible, allowing the length adjustment member to be rotatably driven by a tool, such as by means of a screwdriver, wrench or adjustment key.

The cross bar coupling member may comprise an intermediate support member. The intermediate support member may be an integrated or a separate part of the cross bar coupling member. The intermediate support member may be configured to engage with the first end portion of the length adjustment member, the intermediate support member is configured to enable the first end portion of the length adjustment member to be inserted into the cross bar end cavity when the cross bar coupling member is received in the roof rack cross bar in a retained position.

The intermediate support member may, for example, be made of a metal, such as steel. The intermediate support member may for example be moulded or bent to the desired shape.

The intermediate support member may extend in the longitudinal direction of the cross bar coupling member, having a stepped configuration, in the height direction, with a first and a second substantially parallel plane, the second plane being an elevated plane compared to the first plane, as seen when the roof rack foot is mounted on a vehicle, and the length adjustment member being held by the intermediate support member in the second plane. In such configuration the engaging part, engaging to the first end portion of the length adjustment member, of the intermediate support member may be arranged in the second plane of the intermediate support member.

The fact that the intermediate support member has a stepped configuration, with the second plane being a more elevated plane and the length adjustment member being held by the intermediate support member in the second plane facilitates access to the first end portion of the length adjustment member, such as a head portion of a screw or bolt, and thereby adjustment of the roof rack length. It has been found that it may be difficult to gain proper access for applying a tool to the first end portion of the length adjustment member, for example due to obstructions such as a screw or bolt provided to secure the cross bar coupling member or the intermediate support member to the body of the roof rack foot.

The intermediate support member may comprise at least a first and a second coupling leg extending in the longitudinal direction, wherein the first and the second coupling leg each comprises an engagement portion for engaging with the first end portion of the length adjustment member. The length adjustment member may be arranged to extend in a gap between the first and the second coupling leg. The first and the second coupling leg may furthermore extend in the second plane, in the height direction. The first and second coupling legs may steer and support insertion in and coupling to the end cavity of the roof rack cross bar. The first and the second coupling legs provided on each side of the length adjustment member may also stabilize the length adjustment member when inserted in the end cavity of the cross bar, such as if the coupling legs are resilient or slightly resilient and are slightly compressed upon insertion of the coupling legs within the end cavity of the cross bar such that the gap formed between the first and the second coupling legs is reduced.

The first and/or second coupling legs may be provided with a scale indicating the correct adjustment for a particular vehicle.

A sleeve, such as a resilient sleeve, may be mounted under lateral tension over the first and the second coupling leg, the sleeve being arranged to exert friction against the elongated body portion of the length adjustment member upon rotational movement of the length adjustment member. Preferably the sleeve comprises a guiding track on an inner surface of the sleeve wherein the elongated body portion of the length adjustment member is arranged in the guiding track. The sleeve may furthermore provide a resiliency to the length adjustment member, such that when the length adjustment member is pressed downwards during insertion of the cross bar coupling member into the cross bar the length adjustment member providing a spring back effect and preventing misalignment of the length adjustment member during insertion of the cross bar coupling member into the cross bar.

The fact that a sleeve is mounted under lateral tension over the first and the second coupling leg laterally compresses the coupling legs towards each other such that the gap formed there between is reduced and the lateral and vertical positioning of length adjustment member is stabilized.

The fact that the sleeve is being arranged to exert friction against the elongated body portion of the length adjustment member upon rotational movement of the length adjustment member provides for a rotational resistance against unscrewing of the length adjustment member.

The length adjustment member may have a non-circular cross-sectional shape along the part of the length adjustment member extending between the first and second coupling legs, such as for example between 10 and 25% of the length of the length adjustment member adjacent the first end portion. The length adjustment member may for example have a square, triangular or hexagonal cross-sectional shape along the part of the length adjustment member extending between the first and second coupling legs. Such non-circular shape may in combination with the sleeve provide for a rotational resistance against unscrewing of the length adjustment member.

The fact that the sleeve comprises a guiding track on an inner surface thereof, and wherein the elongated body portion of the length adjustment member is arranged in the guiding track steers the length adjustment member during length adjustment and improves the rotational resistance against unscrewing of the length adjustment member.

The cross bar coupling member may also comprise a locking member adapted to form an engagement and an interlocked position with the cross bar when the cross bar coupling member is at least partly received in the end of the cross bar.

The length adjustment member may be connected to the locking member and be operable to displace the locking member and the cross bar in the longitudinal direction when the cross bar coupling member is in the interlocked position with the cross bar.

The length adjustment member may be a rotatable length adjustment member, such as a screw, and the locking member may be threadably engaged with the length adjustment member, such as by means of a threaded aperture, enabling displacement of the locking member and the cross bar in the longitudinal direction when the cross bar coupling member is in the interlocked position with the cross bar.

The locking member may comprise a male locking element adapted to form an engagement with a mating female cross bar locking element arranged on or in the cross bar.

According to a fifth aspect, the present disclosure relates to a roof rack cross bar adapted to be received and to be connected with a roof rack foot according to the fourth aspect. Optionally, the roof rack cross bar may comprise a female cross bar locking element, such as in the form of a recess or an opening, arranged on or in the roof rack cross bar.

According to a sixth aspect, the present disclosure relates to a system comprising a roof rack foot according to the fourth aspect and a cross bar according to the fifth aspect. The end cavity of the cross bar may have a maximum internal cross section height $h_{cs}$ and the first end portion of the length adjustment member may have a maximum diameter $d_{cs}$ and wherein the height $h_{cs}$ may be between 1-5% greater than the maximum diameter $d_{cs}$ of the first end portion of the length adjustment member.

BRIEF DESCRIPTION OF THE DRAWINGS

The present invention will be further explained hereinafter by means of non-limiting examples and with reference to the appended drawings wherein:

FIG. 1 illustrates a front view of a vehicle having a roof rack attached comprising a first and a second roof rack foot and a roof rack cross bar extending there between;

FIG. 2C illustrates a perspective view of the roof rack foot from FIG. 2B with the cross bar coupling member partly received within the roof rack cross bar;

DETAILED DESCRIPTION

It is to be understood that the drawings are schematic and that individual components are not necessarily drawn to scale. The roof rack, roof rack foot and roof rack cross bar shown in the figures are provided as examples only and should not be considered limiting to the invention. Accordingly, the scope of the invention is determined solely by the appended claims.

Figure 1:
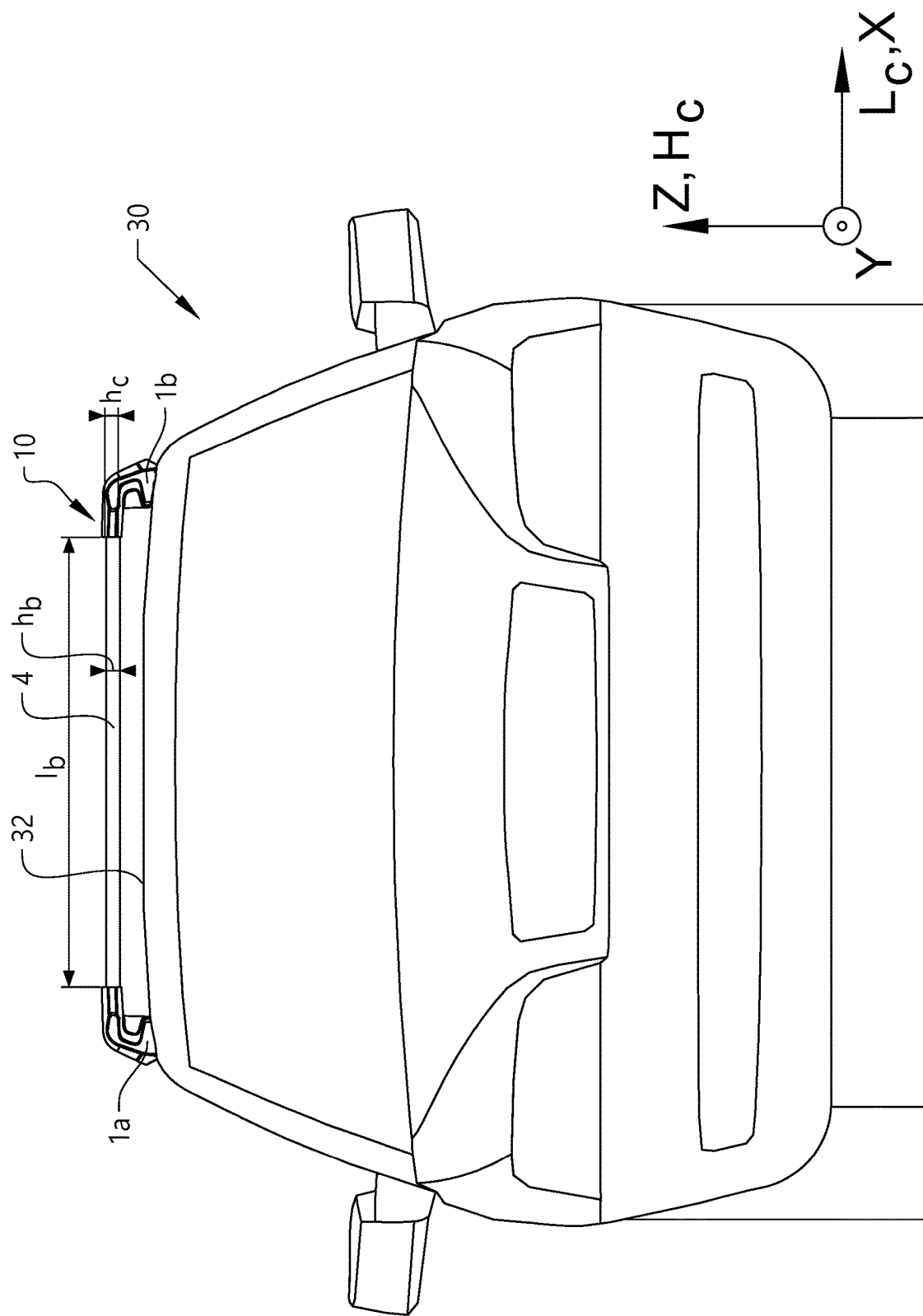

With reference to FIG. 1 shows a vehicle 30 having a roof 32. A roof rack 10 with a first and a second roof rack foot 1a,1b is arranged on the roof 32 of the vehicle 30. A roof rack cross bar 4 extends between the first and the second roof rack foot 1a,1b. The present disclosure mainly relates to flush roof racks which are defined by that the ends of the roof rack cross bar do not extend beyond the roof rack feet. Instead, each end of the crossbar is flush with the respective foot of the roof rack supporting the cross bar at that end. Such roof racks are referred to in this specification as "flush bar" roof racks, or flush roof racks. The length of the roof rack cross bar of a flush roof rack is less than the width of the vehicle to which the roof rack is to be attached. The roof rack is a load carrying roof rack.

The roof rack cross bar 4 has a length $l_b$ extending across the roof 32 of the vehicle 30 and a height $h_b$. Both the height of the vehicle 30, the height $h_b$ of the roof rack cross bar 4 and the height of a roof rack coupling member $h_c$ are measured along a Z axis which extends in the vertical direction of the vehicle 30 when the vehicle 30 is standing on a planar, horizontal surface. The width of the vehicle 30 and the length $l_b$ of the roof rack cross bar 4 are measured along an X axis which is perpendicular to the Z axis. The length of the vehicle 30 is measured along an Y axis which is perpendicular to the Z and X axes.

Figure 2A:
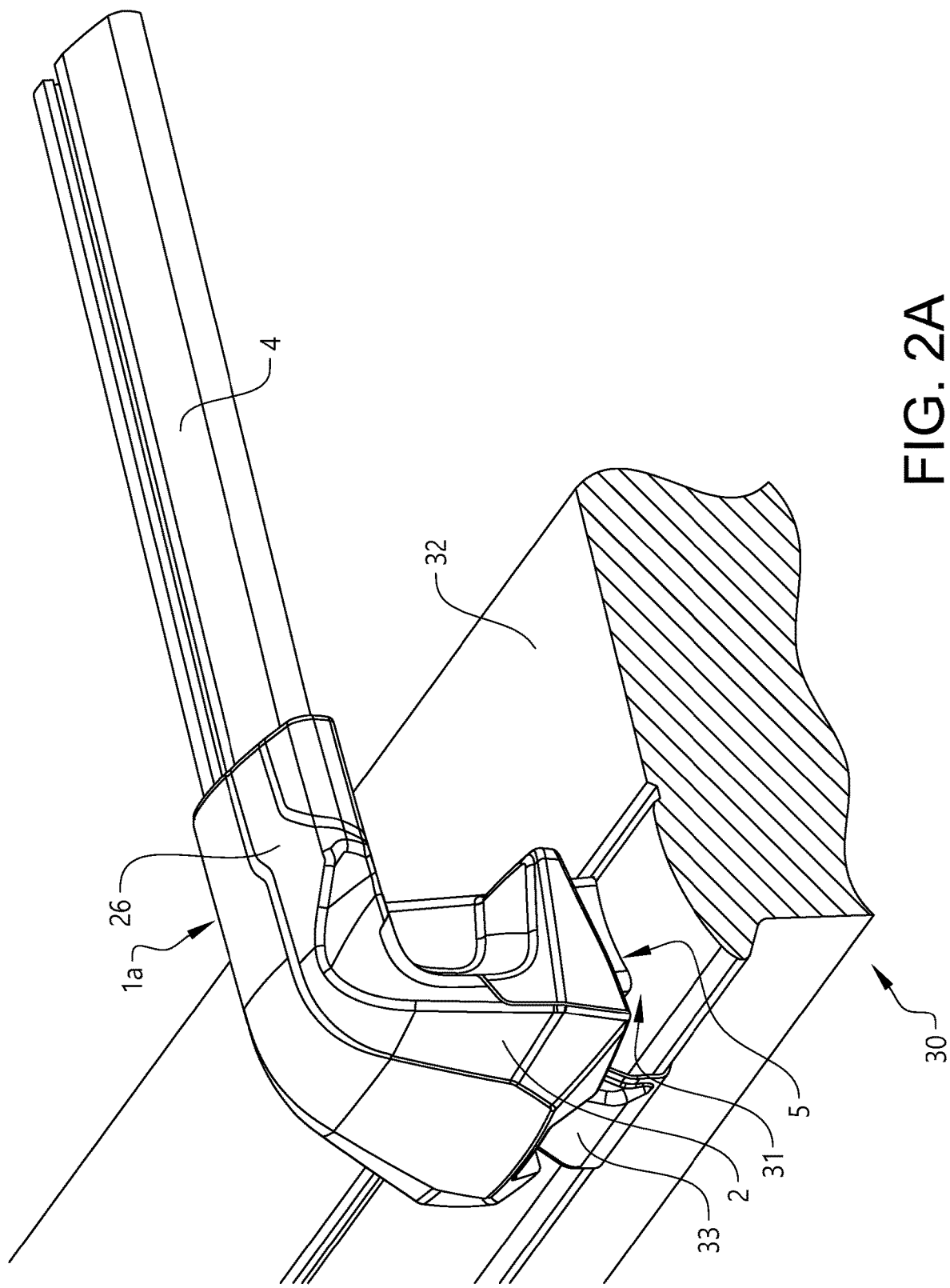
FIG. 2A illustrates a perspective view of a roof rack foot with a roof rack cross bar received in and connected to an end cavity of the roof rack cross bar.

FIG. 2A illustrates the first roof rack foot 1a with an end part of the roof rack cross bar 4 connected to the roof rack foot 1a and received and housed in a roof rack foot housing 26. The first roof rack foot 1a comprises a body 2, the body 2 comprising a support surface 5 adapted to be positioned against a first surface 31 of the vehicle 30. The first surface 31 of the vehicle 30 can be a surface of the roof 32 of the vehicle 30 or optionally a surface, such as a rail, flush rail or similar. The support surface 5 is adapted to cooperate with a retaining arrangement 33, to retain and secure the roof rack foot 1a to the vehicle 30. The retaining arrangement 33 can be of any useful type such as a clamping type, strapping around type, bracket type, fix point type, or any other retaining mechanism, with a clamping type retaining arrangement being shown in the figure.

Figure 2B:
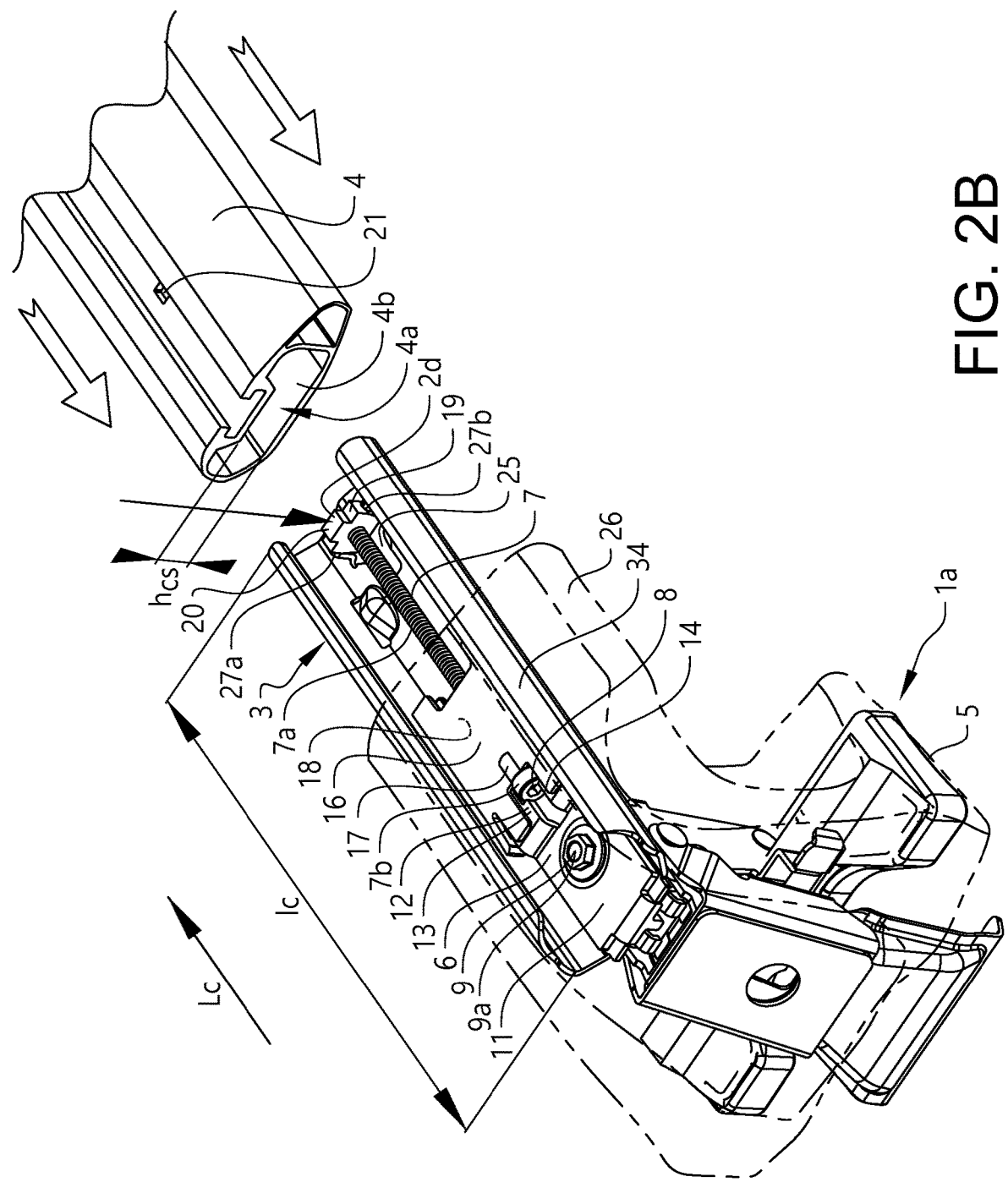
FIG. 2B illustrates a perspective view of a roof rack foot with cross bar coupling member prior to assembly with a roof rack cross bar.

FIGS. 2B-2C illustrate the roof rack foot 1a according to the present disclosure. FIG. 2B illustrates the roof rack foot 1a prior to assembly with the cross bar 4. For illustrative purposes, only parts of the roof rack foot 1a are shown in the FIGS. The roof rack foot 1a comprises a cross bar coupling member 3 adapted to be inserted into an end opening 4b in the cross bar 4 and to be at least partly received in and connected to an end cavity 4a of the cross bar 4. The end opening 4b in the roof rack cross bar 4 is a cross-sectional opening 4b in the roof rack cross bar 4. The cross bar coupling member 3 has a length $l_c$ extending in a longitudinal direction $L_c$ and a height $h_c$, as shown in FIG. 1. The cross bar coupling member 3 comprises a length adjustment member 7, the length adjustment member 7 being operable to displace the cross bar coupling member 3 in the longitudinal direction $L_c$ to enable adjustment of the roof rack 10 (shown in FIG. 1) to the width of the vehicle 30. The length adjustment member 7 extends in the longitudinal direction $L_c$ and has an elongated body portion 7a and an axially aligned first end portion 7b, the first end portion 7b being in the form of a head portion 7b, the head portion 7b being provided with a drive recess 8 for allowing the length adjustment member 7 to be rotatably driven.

The cross bar coupling member 3 further comprises a coupling member body 34 and an intermediate support member 6. The intermediate support member 6 is fixedly attached to the body 2 of the roof rack foot 1a, via the coupling member body 34, with an attachment member 9, in the form of a screw or a bolt. An attachment member head portion 9a is projecting out from the intermediate support member 6 in the height direction $H_c$. The intermediate support member 6 and the coupling member body 34 may either be an integrated part or separate parts of the cross bar coupling member 3. The intermediate support member 6 engages with the head portion 7b of the length adjustment member 7 such that the length adjustment member is supported and extends in the longitudinal direction $L_c$ of the cross bar coupling member 3.

The intermediate support member 6 extends in the longitudinal direction $L_c$ of the cross bar coupling member 3 and has a stepped configuration, as seen in the height direction $H_c$, with a first and a second substantially parallel plane 11, 12, with a first and a second coupling leg 13,14 extending in the longitudinal direction $L_c$ in the second elevated plane 12. The first and the second coupling legs 13,14 each comprises an engagement portion 13a,14a (shown in FIG. 2F) for engaging with the head portion 7b of the length adjustment member 7. The length adjustment member 7 extends in a gap 15 (shown in FIG. 2E) formed between the first and the second coupling leg 13,14. The attachment member 9 attaches the intermediate support member 6 in the part extending in the first plane 11. Thereby, the head portion 7b of the length adjustment member 7 is held in an elevated position in relation to the attachment member head portion 9a and the drive recess 8 is easy to access, such as by means of a screw driver wrench or adjustment key.

A sleeve 16, such as a resilient sleeve, is mounted under lateral tension over the first and the second coupling leg 13,14 by pressing the coupling legs 13,14 together such that the gap 15 (shown in FIG. 2E) may be smaller when the sleeve 16 is mounted over the coupling legs 13,14 and thereby causing the length adjustment member 7 to be held in the sleeve under tension and being centered, as seen in a height direction, such that the head portion 7b and the elongated body portion 7a of the length adjustment member 7 is correctly positioned between the coupling legs 13,14. The sleeve 16 is further arranged to exert friction against the elongated body portion 7a of the length adjustment member 7 to prevent unscrewing of the length adjustment member 7 and to fix the length adjustment member 7 in a correct position between the coupling legs 13,14. The sleeve 16 comprises a guiding track 17 on an inner surface 18 of the sleeve 16 and the elongated body portion 7a of the length adjustment member 7 is arranged to extend in the guiding track 17.

The cross bar coupling member 3 also comprises a locking member 19 adapted to form an engagement with the cross bar 4 in an interlocked position prior to length adjustment of the roof rack 10 and when the cross bar coupling member 3 is partly received in the end 4a of the cross bar 4. The illustrated locking member 19 comprises a male locking element 20 adapted to form an engagement with a mating female cross bar locking element 21 arranged in the cross bar 4. The locking member 19 is provided with a threaded aperture extending in a longitudinal direction $L_c$ of the cross bar coupling member 4. The length adjustment member is threadably engaged with the locking member 19 enabling displacement of the locking member 19 and the cross bar 4 in the longitudinal direction $L_c$ and towards the body 2 of the roof rack foot 1a when the cross bar coupling member 3 is in the interlocked position with the cross bar 4. The cross bar coupling member 3 is provided with a groove/opening 25 allowing downwards movement of the locking member 19, in the height direction $H_c$ (see FIG. 1), during insertion of the cross bar coupling member 3 in the end cavity 4a of the roof rack cross bar 4 while still having a low height cross section $h_{cs}$ in the cross bar 4. The cross bar coupling member 3 furthermore comprises a first and a second vertical support surface 27a,27b projecting out from the coupling member body 34 in the height direction $H_c$ and being arranged to support the locking member 19 and to prevent movement of the length adjustment member 7 and the locking member 19 in a lateral direction, perpendicular to the longitudinal direction $L_c$ of the cross bar coupling member 3, during insertion and coupling of the cross bar coupling member 3 to the roof rack cross bar 4.

For assembly of the roof rack foot 1a and the roof rack cross bar 4, the user thus inserts the coupling member body 34 into the end cavity 4a of the cross bar 4 with the locking member 19 with the male locking element 20 being pressed downward into the opening such that the cross bar coupling member 3 may fit into the end cavity 4a of the cross bar 4. In the embodiment disclosed in FIG. 2B, the roof rack foot 1a further comprises a roof rack foot housing 26 cooperating with the roof rack coupling member 3 to retain the roof rack cross bar 4 in a retained position after insertion of the cross bar coupling member 3 into the end cavity 4a of the cross bar 4.

FIG. 2C shows the roof rack foot 1a when the cross bar coupling member 3 has been inserted in the cross bar 4 and the male locking element 20 has engaged with the female locking element 21. The length of the roof rack 10 may subsequently be adjusted by rotating the length adjustment member 7, as indicated by the arrow, by means of a screw driver, for example, until the length is adjusted to fit the width of the vehicle roof 32 (not shown in FIG. 2C).

Figure 2D:
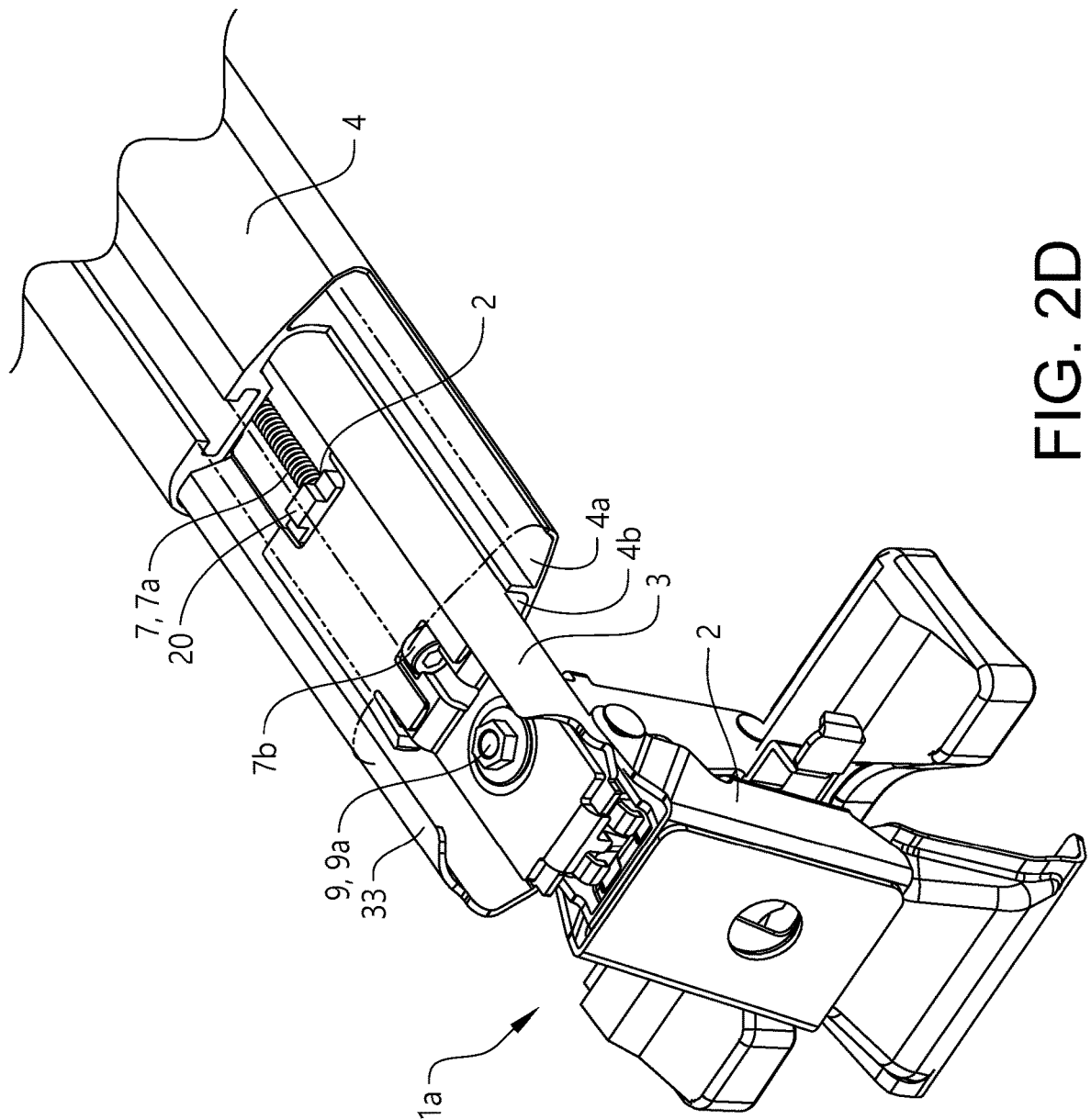
FIG. 2D illustrates the roof rack according to FIG. 2C with the cross bar coupling member received in the roof rack cross bar in a retained position.

As illustrated in FIG. 2D, the cross bar coupling member 3 is configured to enable the length adjustment member 7, including the head portion 7b, to be inserted into the cross bar end cavity 4a when said cross bar coupling member 3 is received in the roof rack cross bar 4 in a retained position, and if needed due to the width of the roof of the vehicle 30. In a retained position the length adjustment member 7 may be fully or partly or inserted into the cross bar end cavity 4a depending, on the width of the vehicle roof 32 (not shown) and the length adjustment/telescoping of the roof rack therefore needed.

The opening 25 (see FIG. 2B) provided in the coupling member body 34 and arranged to allow a downward movement when the male locking element 20 is in an initial distal position, i.e. prior to length adjustment of the roof rack 10 and rotational movement of the length adjustment member 7 and movement of the locking element 20 and the roof rack cross bar 4 in the longitudinal direction $L_b$ of the cross bar coupling member 3. However, as the male locking element 20, together with the cross bar 4, is forced towards the body 2 of the roof rack foot 1a, the male locking element 20 is displaced in relation to the opening 25 provided in the coupling member body 34 and is therefore kept in engagement with the female locking element 21 in the cross bar 4. To allow downwards movement of the male locking element 20 and unlocking of the roof rack foot 1a and the roof rack cross bar 4, the length adjustment member 7 needs to be unscrewed and released until the male locking element 20 is in its initial position above the opening 25 (which may be seen in FIG. 2B) again.

Figure 2E:
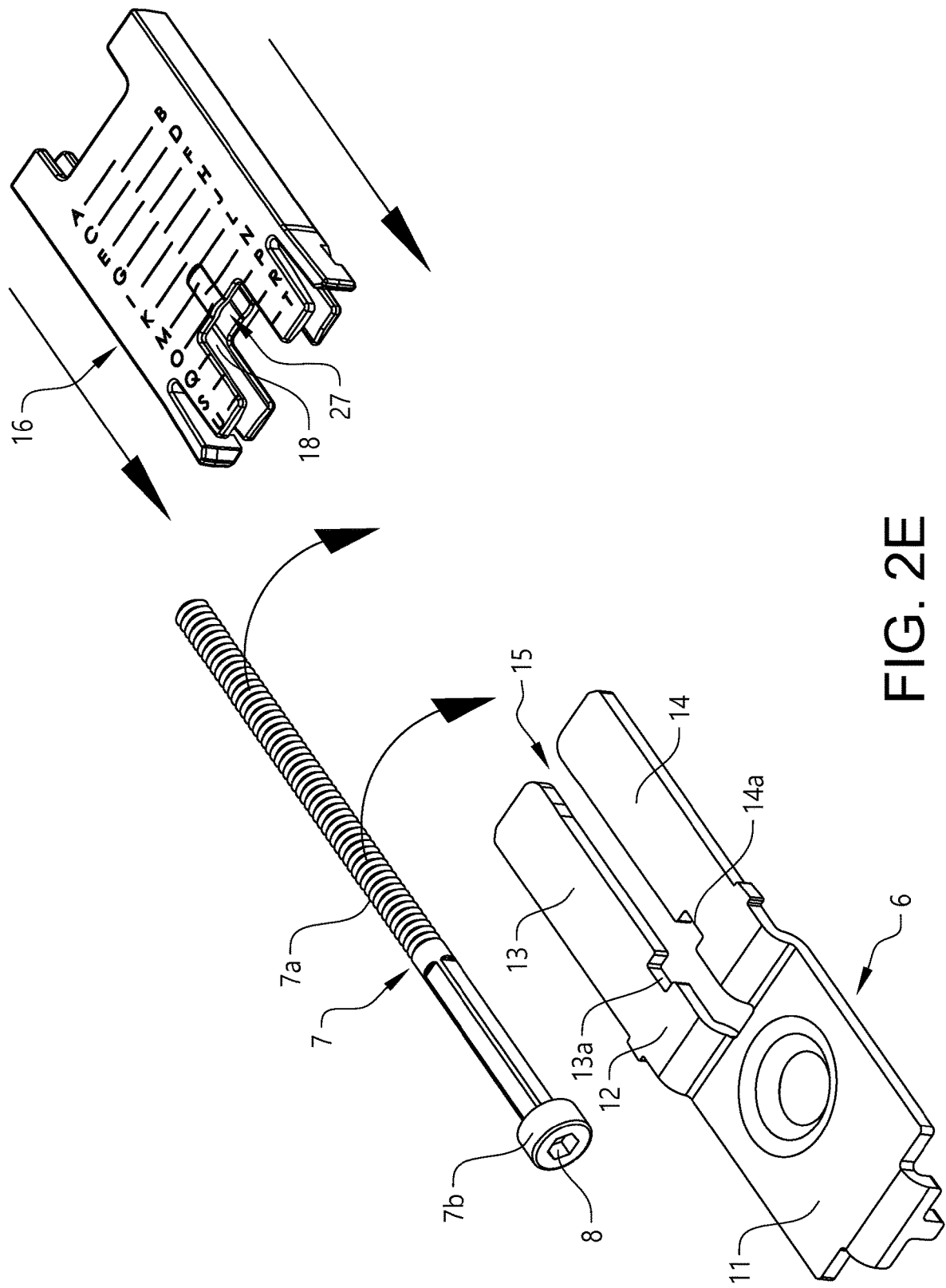
FIG. 2E illustrates a perspective view of the intermediate support member, the length adjustment member and the sleeve according to the invention and as separate items.

FIG. 2E illustrates the intermediate support member 6, the length adjustment member 7 and the sleeve 16 from FIGS. 2B-2D as separate items for the purpose of clarity.

The length adjustment member 7 comprises the elongated body portion 7a and the first end portion 7b in the form of a head portion 7b. The head portion 7b is provided with a drive recess 8 to allow the length adjustment member 7 to be rotatably driven. The elongated body portion 7a is threaded on a major part thereof. A portion of the elongated body portion 7a being adjacent the head portion 7b has a non-circular cross section, here a squared cross section.

The intermediate support member 6 has a stepped configuration as described above and as seen in the height direction $H_c$, with the first and the second substantially parallel plane 11, 12. The first and the second coupling leg 13,14 extend in the longitudinal direction $L_c$ in the second elevated plane 12. The first and the second coupling legs 13,14 each comprises an engagement portion 13a,14a, here in the form of a notch in each of the coupling legs 13,14 for accommodating and engaging with the head portion 7b of the length adjustment member 7. When being assembled, the length adjustment member 7 extends in a gap 15 formed between the first and the second coupling leg 13,14.

The sleeve 16 comprises guiding track 17 on an inner surface 18 thereof in which the elongated body portion 7a of the length adjustment member 7 is arranged to extend. The sleeve 16 is mounted under lateral tension over the first and the second coupling leg 13,14 such that the head portion 7b of the length adjustment member 7 is correctly positioned, laterally and vertically, between the coupling legs 13,14. As the length adjustment member 7a has a squared cross-section and the difference in diameter depending on the position of the length adjustment member 7, the sleeve 16 will exerts friction against the elongated body portion 7a of the length adjustment member 7 and prevent unscrewing of the length adjustment member 7.

Figure 2F:
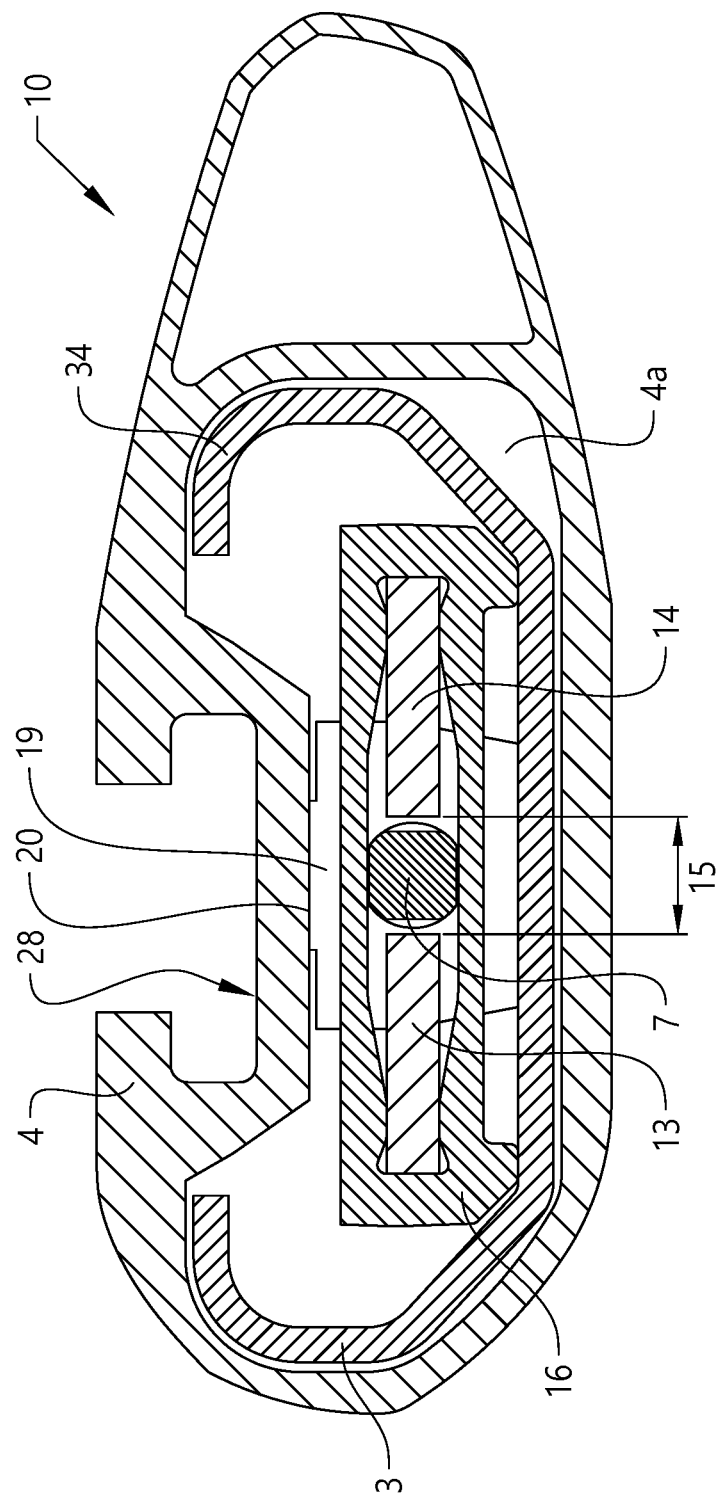
FIG. 2F illustrates a cross sectional view of the cross view of the cross bar coupling member received in the roof rack cross bar according to FIG. 2D.

FIG. 2F is a cross sectional view of the roof rack 10 as shown in the FIGS. 2A-2D, illustrating the cross bar coupling member 3 being inserted in the cross bar end cavity 4 and received the roof rack cross bar 4 in a retained position. As may be seen in FIG. 2F, the cross section of the cross bar coupling member and the coupling member body 34 correspond essentially to the cross section of the end cavity 4a of the cross bar 4. The length adjustment member 7 extends in the cavity 15 provided between the first and second coupling leg 13,14 of the intermediate support member 6. The sleeve 16 is mounted around the first and the second coupling legs 13,14, providing support to the length adjustment member in the height direction $H_c$, but also laterally. As may be seen in the figure, the length adjustment member 7 has a square cross section as disclosed above. The length adjustment member 7 furthermore extends through a threaded aperture provided in the locking member. The locking member 19 comprises a male locking element 20 being in engagement with a mating female locking element 21 (shown in FIG. 2B) in the form of an opening. The cross bar 4 comprises a longitudinal cross bar groove 28 extending in the longitudinal direction $L_b$ of the cross bar. The longitudinal cross bar groove 28 may be sealed with a strip, such as a silicon list such that an internal cavity may be formed. Thereby, the wall of the cross bar comprising the female locking element 21 may be seen as an internal wall.

Figure 3:
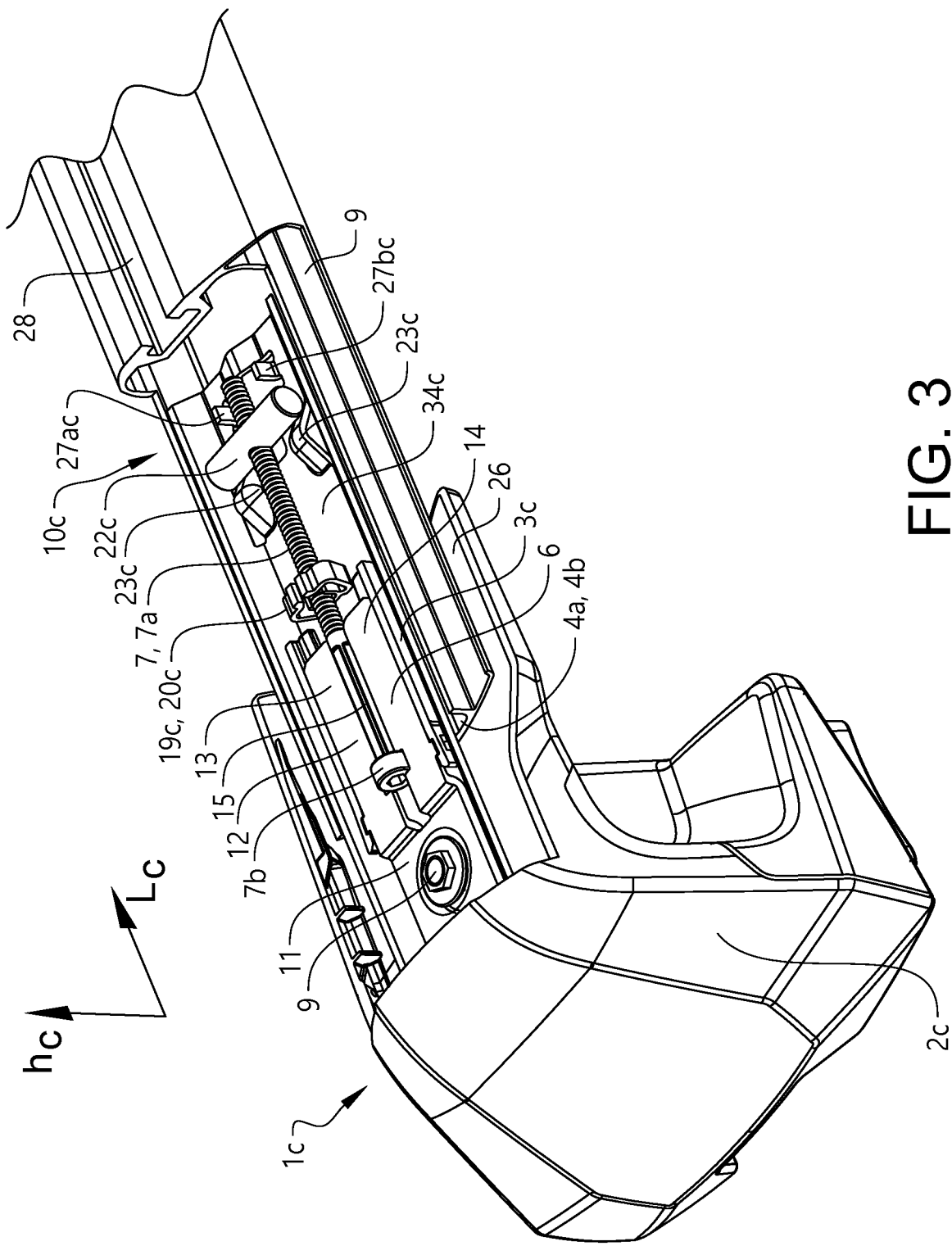
FIG. 3 illustrates a roof rack foot with a cross bar coupling member according to the present disclosure.

FIG. 3 illustrates a cross bar coupling member 3c according to the present disclosure. The roof rack foot 1c comprises a cross bar coupling member 3c adapted to be at least partly received in and connected to the end cavity 4a of the cross bar 4. In FIG. 3 the roof rack cross bar 4 is only shown in part for better visibility of the parts of the cross bar coupling member 3c parts. As, may be seen, the roof rack foot 1c further comprises a roof rack foot housing 26 which cooperate with the cross bar coupling member 3c to retain the roof rack cross bar 4 in a retained position after insertion of the cross bar coupling member 3 into the end cavity 4a of the cross bar 4. The roof rack foot housing 26 is only illustrated in part for better visibility of the cross bar coupling member 3.

The cross bar coupling member 3c comprises a length adjustment member 7, the length adjustment member 7 being operable to displace the cross bar coupling member 3c in the longitudinal direction $L_c$ to enable adjustment and telescoping of the roof rack 10c to the width of the vehicle 30. The length adjustment member 7 extends in the longitudinal direction $L_c$ of the cross bar coupling member 3 and has an elongated body portion 7a and an axially aligned first end portion 7b. The cross bar coupling member 3c further comprises an intermediate support member 6 which is fixedly attached to a body 2c of the roof rack foot 1c, via the cross bar coupling member 3c, with an attachment member 9, in the form of a screw or a bolt. An attachment member head portion 9a is projecting out from the intermediate support member 6 in the height direction $H_c$ of the cross bar coupling member 3 (see FIG. 1). The intermediate support member 6 engages with the first end portion 7b of the length adjustment member 7 such that the length adjustment member is supported and extends in the longitudinal direction $L_c$ of the cross bar coupling member 3c.

The intermediate support member 6 has a stepped configuration, as seen in the height direction $H_c$, with a first and a second substantially parallel plane 11, 12, with a first and a second coupling leg 13,14 extending in the longitudinal direction $L_c$ in the second elevated plane 12. The first and the second coupling legs 13,14 each comprises an engagement portion 13a,14a for engaging with the first end portion 7b of the length adjustment member 7. The length adjustment member 7 extends in a gap 15 formed between the first and the second coupling leg 13,14. The attachment member 9 attaches the intermediate support member 6 in the part extending in the first plane 11.

The cross bar coupling member 3c also comprises a locking member 19c. The locking member 19c is adapted to form an engagement with the cross bar 4 in an interlocked position prior to length adjustment of the roof rack 10c and when the cross bar coupling member 3c is partly received in the end cavity 4a of the cross bar 4. The locking member 19c as illustrated comprises a male locking element 20c, here in the form of a clip enclosing the length adjustment member 7 and with an upper protruding part adapted to form an engagement with an opening 21 (which may be seen in FIG. 2B) arranged in the cross bar 4. The upper protruding part of the clip is constituted by two vertically protruding end portions of the clip which during insertion of the cross bar coupling member 3c into the end cavity 4a of the cross bar 4 will separate laterally allowing the cross bar coupling member 3c to be inserted in the end opening 4b of the cross bar 4. The locking member 19c furthermore comprises a female fastener 22c, here in the form of a fastener with a threaded hole, and two retaining elements 23c preventing the female fastener 22c to move in the longitudinal direction $L_c$ of the cross bar coupling member 4 and towards the body 2 of the roof rack foot 1c during length adjustment of the roof rack 10. The retaining elements 23c are here each provided with upwards slanted surfaces allowing the female fastener 22c to slide upwards and backwards, i.e. in a longitudinal direction $L_c$ of the cross bar coupling member 3c and towards the body 2 of the roof rack foot 1c until the female fastener 22c is clamped against the retaining elements 23c and the inner roof of the cross bar 4. The retaining elements 23c are thus arranged with a shorter distance to the body 2c of the roof rack foot 1c, as measured in a longitudinal direction $L_c$, compared to the female fastener 22c. The length adjustment member 7 is threadably engaged with the female fastener 22c which is retained in position in the cross bar coupling member 3c by means of the retaining elements 23c. The length of the roof rack 10 will be adjusted by driving the length adjustment member 7 to rotate, by means of for example a screwdriver, and thereby forcing the cross bar 4 and the clip 19c to move in a longitudinal direction $L_c$ towards the body 2 of the roof rack foot 1c. The rotation of the length adjustment member 7 will also cause the female fastener 22c to press and slide upwards onto the slanted surfaces of the retaining elements 23c and there be clamped against the retaining element 23c and the inner roof of the cross bar 4.

The cross bar coupling member 3c furthermore comprises a first and a second vertical support surface 27ac,27bc projecting out from the coupling member body 34c in the height direction $H_c$ and being arranged to prevent movement of the female fastener 22c in a, longitudinal direction $L_c$ of the cross bar coupling member 3c during insertion and coupling of the cross bar coupling member 3 to the roof rack cross bar 4. The first and the second vertical support surface 27ac,27bc are further arranged to prevent movement of the length adjustment member 7 in a lateral direction, perpendicular to the longitudinal direction $L_c$ of the cross bar coupling member 3c. The first and the second vertical support surface 27ac, 27bc are arranged with a greater distance to the body 2c of the roof rack foot 1c compared to the female fastener 22c, as seen in a longitudinal direction $L_c$.

FIG. 3 shows the roof rack foot 1c when the cross bar coupling member 3c has been inserted into the cross bar 4 and the male locking element 20c of the cross bar coupling member 3c has engaged with the female locking element in the roof rack cross bar 4 such that the cross bar coupling member 3c and the cross bar 4 is in an interlocked position. Length adjustment of the roof rack 10c to fit the width of the vehicle roof is achieved by rotating the length adjustment member 7 and thereby forcing the cross bar 4 towards the roof rack foot 1c and the intermediate coupling member 6 and the length adjustment member 7, including the first end portion 7b, into the end cavity 4a of the cross bar 4.

The embodiment illustrated in FIG. 3 may for example be suitable for use in combination with retaining arrangement such as strapping around type, bracket type, fix point type, as disclosed above.

Figure 4:
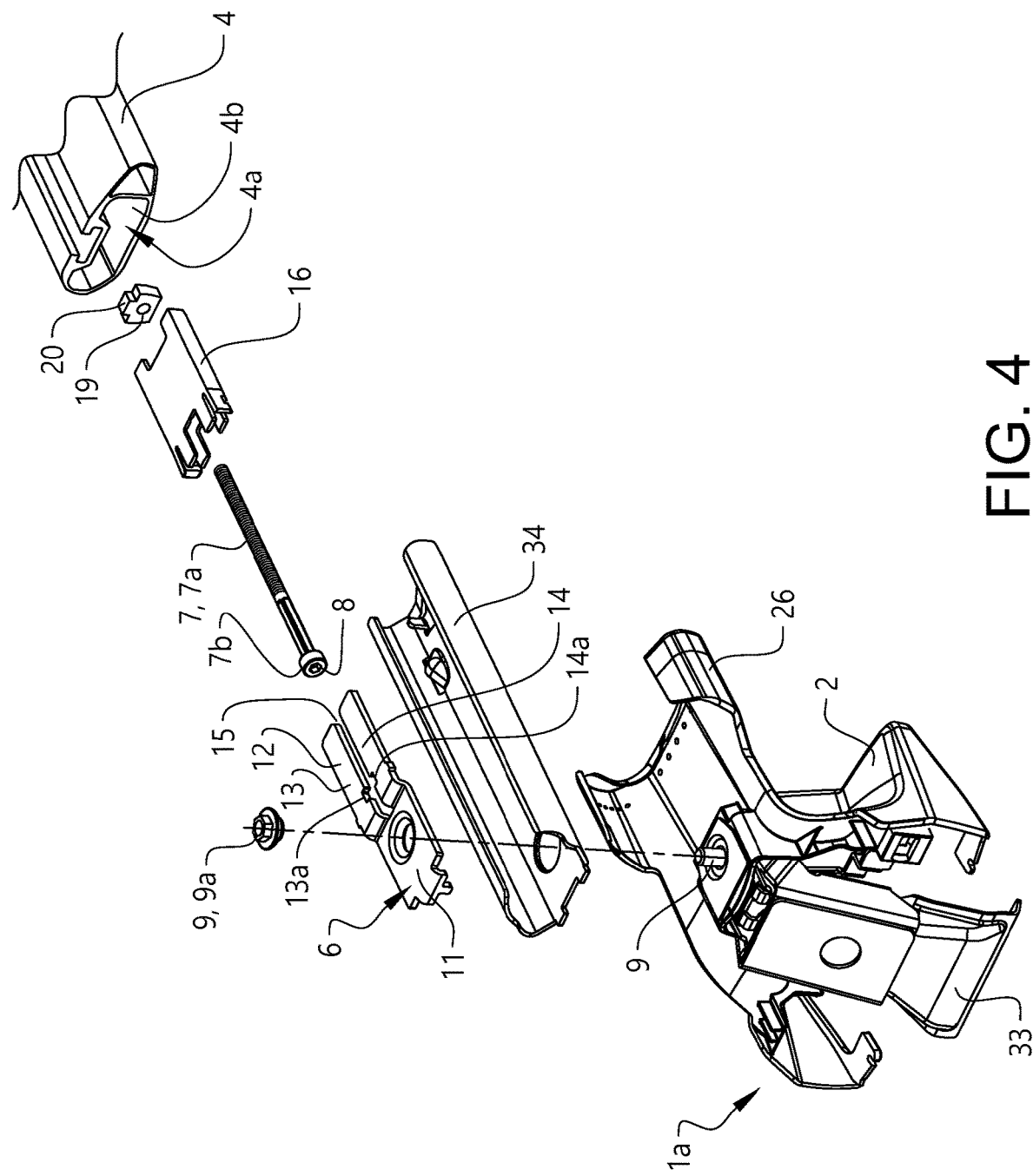
FIG. 4 illustrates an exploded view of the roof rack foot from FIG. 2c.

FIG. 4 shows an exploded view of the roof rack foot 1a and the cross bar 4 forming a system. The roof rack foot 1a comprises the body 2, the cross bar coupling member 3 and the roof rack foot housing 26. The roof rack cross bar 4 connects to the roof rack foot 1 via the cross bar coupling member 3 and is received and housed in the roof rack foot housing 26. The body 2 comprises the retaining arrangement 33 for retaining and securing the roof rack foot 1a to the vehicle. The retaining arrangement 33 can be of any useful type such as a clamping type, strapping around type, bracket type, fix point type, or any other retaining mechanism, with a clamping type retaining arrangement being shown in the figure.

FIG. 4 illustrates how the parts of the roof rack foot 1a are connected and cooperates. The roof rack foot 1a comprises the cross bar coupling member 3 adapted to be inserted into the end opening 4*b* in the cross bar 4 and to be at least partly received in and connected to the end cavity 4*a* of the cross bar 4. The cross bar coupling member 3 comprises the length adjustment member 7 which is operable to displace the cross bar coupling member 3 in the longitudinal direction $L_c$ to enable adjustment of the roof rack 10 (shown in FIG. 1) to the width of the vehicle 30. The length adjustment member 7 as shown in FIG. 4 has the elongated threaded body portion 7*a* and the axially aligned first end portion 7*b* in the form of a head portion 7*b* provided with the drive recess 8 for allowing the length adjustment member 7 to be rotatably driven.

The cross bar coupling member 3 further comprises the coupling member body 34 and an intermediate support member 6 fixedly attached to and at least partly housed within the coupling member body 34. The coupling member body 34 is fixedly attached to the body 2, with an attachment member 9, here in the form of a bolt. The attachment member head portion 9*a* is, as illustrated, projecting out from the intermediate support member 6 in the height direction $H_c$. The intermediate support member 6 engages with the head portion 7*b* of the length adjustment member 7 such that the length adjustment member is supported and extends in the longitudinal direction of the cross bar coupling member 3.

The intermediate support member has a stepped configuration, as seen in the height direction $H_c$, with a first and a second substantially parallel plane 11, 12, with a first and a second coupling leg 13,14 extending in the longitudinal direction $L_c$ in the second elevated plane 12. The first and the second coupling legs 13,14 each comprises the engagement portion 13*a*,14*a* for engaging with the head portion 7*b* of the length adjustment member 7. The length adjustment member 7 extends in the gap 15 formed between the first and the second coupling leg 13,14. The attachment member 9 attaches the intermediate support member 6 in the part extending in the first plane 11. Thereby, the head portion 7*b* of the length adjustment member 7 is held in an elevated position in relation to the attachment member head portion 9*a* and the drive recess 8 is easy to access, such as by means of a screw driver wrench or adjustment key.

The sleeve 16 is mounted under lateral tension over the first and the second coupling leg 13,14 by pressing the coupling legs 13,14 together such that the gap 15 may be smaller when the sleeve 16 is mounted over the coupling legs 13,14 and thereby causing the length adjustment member 7 to be held in the sleeve 16 under tension and being centered, as seen in a height direction, such that the head portion 7*b* and the elongated body portion 7*a* of the length adjustment member 7 is correctly positioned between the coupling legs 13,14. The length adjustment member 7 further has a square cross-sectional shape along parts of the section of the length adjustment member 7 extending between the first and second coupling legs 13,14. Such non-circular shape may in combination with the sleeve 16 provide for a rotational resistance against unscrewing of the length adjustment member 7 and to fix the length adjustment member 7 in a correct position between the coupling legs 13,14.

The locking member 19 comprises the male locking element 20 which is adapted to form an engagement with the cross bar 4 in an interlocked position prior to length adjustment of the roof rack 10 and when the cross bar coupling member 3 is partly received in the end 4*a* of the cross bar 4. The locking member 19 is provided with a threaded aperture extending in a longitudinal direction $L_c$ of the cross bar coupling member 4 and the length adjustment member 7 extends through the threaded aperture. The length adjustment member 7 is thus threadably engaged with the locking member 19 enabling displacement of the locking member 19 and the cross bar 4 in the longitudinal direction $L_c$ and towards the body 2 of the roof rack foot 1*a* when the cross bar coupling member 3 is in the interlocked position with the cross bar 4.

The invention claimed is:

1. A roof rack foot of a roof rack for a vehicle, the roof rack foot comprising:
   a body comprising a support surface configured to be positioned against a first surface of the vehicle;
   a cross bar comprising a first end opening and a first end cavity; and
   a cross bar coupling member coupled to the body and configured to be inserted into the first end opening and configured to be at least partly received in and connected to the first end cavity in a retained configuration, the cross bar coupling member comprising:
     a length extending in a longitudinal direction and a height extending in a height direction;
     a length adjustment member extending in the longitudinal direction and having an elongated body portion and an axially aligned first end portion; and
     an intermediate support member configured to engage the first end portion of the length adjustment member and configured to enable the length adjustment member to be fully or partly inserted into the first end cavity of the cross bar in the retained configuration,
   wherein the intermediate support member extends in the longitudinal direction of the cross bar coupling member and has a stepped configuration in the height direction,
   wherein the stepped configuration comprises first and second substantially parallel planes, the second plane being an elevated plane in the height direction relative to the first plane, and
   wherein the length adjustment member is coupled to the intermediate support member in the second plane.

2. The roof rack foot according to claim 1, wherein the length adjustment member comprises a rotatable length adjustment member having a first end portion with a drive recess configured to rotatably drive the length adjustment member.

3. The roof rack foot according to claim 2, wherein the cross bar coupling member is fixedly attached to the body of the roof rack foot with an attachment member having an attachment member head portion projecting out from the cross bar coupling member in the height direction.

4. The roof rack foot according to claim 3, wherein the cross bar coupling member is further configured to hold the first end portion of the rotatable length adjustment member in an elevated plane in the height direction relative to the attachment member head portion such that the drive recess is accessible for adjustment.

5. The roof rack foot according to claim 1, wherein:
   the intermediate support member further comprises first and second coupling legs extending in the longitudinal direction, and
   the length adjustment member is configured to extend in a gap disposed between the first and second coupling legs.

6. The roof rack foot according to claim 5, wherein:
   the first and second coupling legs each comprise an engagement portion configured to engage the first end portion of the length adjustment member, and
   the first and second coupling legs extend in the second plane in the height direction.

7. The roof rack foot according to claim 6, further comprising a sleeve coupled to the length adjustment member and the first and second coupling legs and configured to exert a frictional force against the length adjustment member upon rotational movement of the length adjustment member, wherein the sleeve is mounted under lateral tension over the first and second coupling legs.

8. The roof rack foot according to claim 7, wherein:
the sleeve comprises a guiding track on an inner surface of the sleeve, and
the length adjustment member is arranged in the guiding track.

9. The roof rack foot according to claim 1, wherein the cross bar coupling member further comprises a locking member configured to form an engagement position and an interlocked position with the cross bar when the cross bar coupling member is at least partly disposed in the first end cavity of the cross bar.

10. The roof rack foot according to claim 9, wherein the length adjustment member is coupled to the locking member and is configured to displace the locking member and the cross bar in the longitudinal direction when the cross bar coupling member is in the interlocked position with the cross bar.

11. The roof rack foot according to claim 10, wherein the length adjustment member comprises a rotatable length adjustment member and the locking member is threadably engaged with the length adjustment member for displacement of the locking member and the cross bar in the longitudinal direction when the cross bar coupling member is in the interlocked position with the cross bar.

12. The roof rack foot according to claim 9, wherein the locking member comprises a male locking element configured to form an engagement with a female locking element disposed on or in the cross bar.

13. The roof rack foot according to claim 12, wherein the female locking element comprises a recess or an opening.

14. A roof rack for a vehicle, the roof rack comprising:
a body comprising a support surface configured to be positioned against a first surface of the vehicle;
a cross bar comprising a first end opening and a first end cavity; and
a cross bar coupling member coupled to the body and configured to be inserted into the first end opening and configured to be at least partly received in and connected to the first end cavity in a retained configuration, the cross bar coupling member comprising:
a length extending in a longitudinal direction and a height extending in a height direction;
a length adjustment member extending in the longitudinal direction and having an elongated body portion and an axially aligned first end portion; and
an intermediate support member configured to engage the first end portion of the length adjustment member and configured to enable the length adjustment member to be fully or partly inserted into the first end cavity of the cross bar in the retained configuration,
wherein the cross bar coupling member further comprises a locking member configured to releasably engage with the cross bar in an interlocked position with the cross bar when the cross bar coupling member is at least partly disposed in the first end cavity of the cross bar, and
wherein the locking member is moveable in the height direction to releasably engage with the cross bar.

15. The roof rack according to claim 14, wherein the locking member comprises a male locking element that engages with a female locking element disposed in the cross bar when the lock member is in the interlocked position.

16. The roof rack according to claim 15, wherein the male locking element comprises a protrusion and the female locking element comprises a recess or an opening.

17. The roof rack according to claim 14, wherein the locking member is biased into the interlocked position with the cross bar.

18. A roof rack for a vehicle, the roof rack comprising:
a body comprising a support surface configured to be positioned against a first surface of the vehicle;
a cross bar comprising a first end opening and a first end cavity; and
a cross bar coupling member coupled to the body and configured to be inserted into the first end opening and configured to be at least partly received in and connected to the first end cavity in a retained configuration, the cross bar coupling member comprising:
a length extending in a longitudinal direction and a height extending in a height direction;
a length adjustment member extending in the longitudinal direction and having an elongated body portion and an axially aligned first end portion; and
an intermediate support member configured to engage the first end portion of the length adjustment member and configured to enable the length adjustment member to be fully or partly inserted into the first end cavity of the cross bar in the retained configuration,
wherein the cross bar coupling member further comprises a locking member having a male locking element configured to engage with an opening that extends through the cross bar.

19. The roof rack according to claim 18, wherein the opening is disposed in an upper surface of the first end cavity.

20. The roof rack according to claim 18, further comprising a cross bar groove that extends along the cross bar in the longitudinal direction, and the opening extends from the first end cavity and into the cross bar groove.

* * * * *